United States Patent

Maufer et al.

(10) Patent No.: US 7,397,776 B2
(45) Date of Patent: Jul. 8, 2008

(54) SYSTEMS AND METHODS FOR AUTONOMOUSLY AND DYNAMICALLY OPTIMIZING TRANSMISSION POWER IN A WIRELESS NETWORK

(75) Inventors: Thomas Maufer, Menlo Park, CA (US); Suresh Rajan, San Jose, CA (US); Edward Wai Yeung Liu, Milpitas, CA (US); Sameer Nanda, San Jose, CA (US); Paul J. Sidenblad, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 514 days.

(21) Appl. No.: 10/953,222

(22) Filed: Sep. 28, 2004

(65) Prior Publication Data

US 2005/0152321 A1  Jul. 14, 2005

Related U.S. Application Data

(60) Provisional application No. 60/508,361, filed on Oct. 3, 2003.

(51) Int. Cl.
*H04Q 7/00* (2006.01)
*H04B 7/185* (2006.01)
*H04B 17/00* (2006.01)

(52) U.S. Cl. ............... 370/329; 455/13.4; 455/69; 455/522

(58) Field of Classification Search .......... 370/329, 370/318, 332; 455/423, 13.4, 522, 67.11, 455/69, 574, 115.3, 127.1–127.2
See application file for complete search history.

(56) References Cited

U.S. PATENT DOCUMENTS

| 6,370,359 | B1 * | 4/2002 | Ue et al. .................. 455/69 |
| 2003/0003905 | A1 | 1/2003 | Shvodian | |
| 2003/0039217 | A1 | 2/2003 | Seo et al. | |
| 2004/0047425 | A1 | 3/2004 | Itoh | |

FOREIGN PATENT DOCUMENTS

EP  1355433 A  10/2003
EP  1357681 A  10/2003

* cited by examiner

*Primary Examiner*—Duc Nguyen
*Assistant Examiner*—Michael T Thier
(74) *Attorney, Agent, or Firm*—Patterson & Sheridan, LLP

(57) ABSTRACT

A method for autonomously and dynamically optimizing transmission power of an endpoint in a wireless network includes the step of monitoring a received signal strength, a received signal quality and a transmission error rate of a signal transmitted between an access point in the wireless network and the endpoint at a given transmission power and transmission speed. The method also includes the steps of reducing the transmission power when the received signal strength, the received signal quality and the transmission error rate are at respectively acceptable operating levels and then monitoring the transmission error rate of the signal transmitted at the reduced transmission power level. The method further includes the step of adjusting one of the transmission power or the transmission speed based on whether the transmission error rate of the signal transmitted at the reduced transmission power is still at its respective acceptable operating level.

18 Claims, 5 Drawing Sheets

SYSTEMS AND METHODS FOR AUTONOMOUSLY AND DYNAMICALLY OPTIMIZING TRANSMISSION POWER IN A WIRELESS NETWORK

CROSS-REFERENCE TO RELATED APPLICATION

This application relates to, and claims the priority benefit of, U.S. Provisional Patent Application No. 60/508,361, titled, "System and Method for Autonomously and Dynamically Optimizing Transmission Power in a Wireless Network," filed Oct. 3, 2003. The subject matter of this related application is hereby incorporated by reference.

BACKGROUND OF THE INVENTION

1. Field of the Invention

This invention generally relates to wireless networks and more specifically to a systems and methods for autonomously and dynamically optimizing transmission power in a wireless network.

2. Description of the Background Art

In wireless networks, the transmission power level of the endpoint is one of the biggest drains on endpoint battery power. Some current systems attempt to tailor transmission power through a process sometimes referred to as "ranging," whereby an exchange occurs at the beginning of a connection to determine the attenuation between peer devices. The transmission power is then adjusted to overcome the attenuation without using more power than necessary. For example, when peers are detected to be located relatively closer to each other upon connecting, the transmission power level could be set lower than when the peers are located relatively father from each other upon connecting.

A drawback to ranging is that once this process is completed, transmission power is effectively static. Not adjusting transmission power to account for changes in the network environment may lead to various performance deficiencies if the peers are able to move relative to one another. For example, if one peer moves closer to the other, less transmission power is required to maintain signal quality. Not reducing the transmission power level in such a situation wastes endpoint battery power. On the other hand, if the peers move farther apart, more transmission power is required to maintain signal quality. Not increasing the transmission power level in such a situation leads to signal quality degradation.

In addition, in current wireless network systems, each endpoint usually is connected to the wireless network at the maximum available transmission speed without taking into account a user's preference to connect at a lower transmission speed. Thus, the endpoint typically does not connect at a lower endpoint transmission speed even if the user would prefer doing so to conserve endpoint battery power. Not reducing endpoint transmission speed in such situations also wastes endpoint battery power.

SUMMARY OF THE INVENTION

One embodiment of a method for autonomously and dynamically optimizing transmission power of an endpoint in a wireless network includes the step of monitoring a received signal strength, a received signal quality and a transmission error rate of a signal transmitted from an access point in the wireless network to the endpoint at a given transmission power and transmission speed. The method also includes the steps of reducing the transmission power when the received signal strength, received signal quality and transmission error rate are at respectively acceptable operating levels and then monitoring the transmission error rate of the signal transmitted at the reduced transmission power level. The method further includes the step of adjusting one of the transmission power or the transmission speed based on whether the transmission error rate of the signal transmitted at the reduced transmission power level is still at its respective acceptable operating level.

Persons skilled in the art will appreciate that the disclosed method trades off reductions in endpoint transmission speed against reductions in transmission power to maintain acceptable throughput while minimizing transmission power consumed during operation. A wireless driver or some other functional element in the endpoint may be advantageously configured to cycle through the method steps while data traffic is flowing between the endpoint and, for example, an access point. In this fashion, the balance between endpoint transmission speed and endpoint transmission power is continually optimized, thereby decreasing the amount of endpoint battery power consumed during operation.

DETAILED DESCRIPTION OF THE INVENTION

Figure 1:
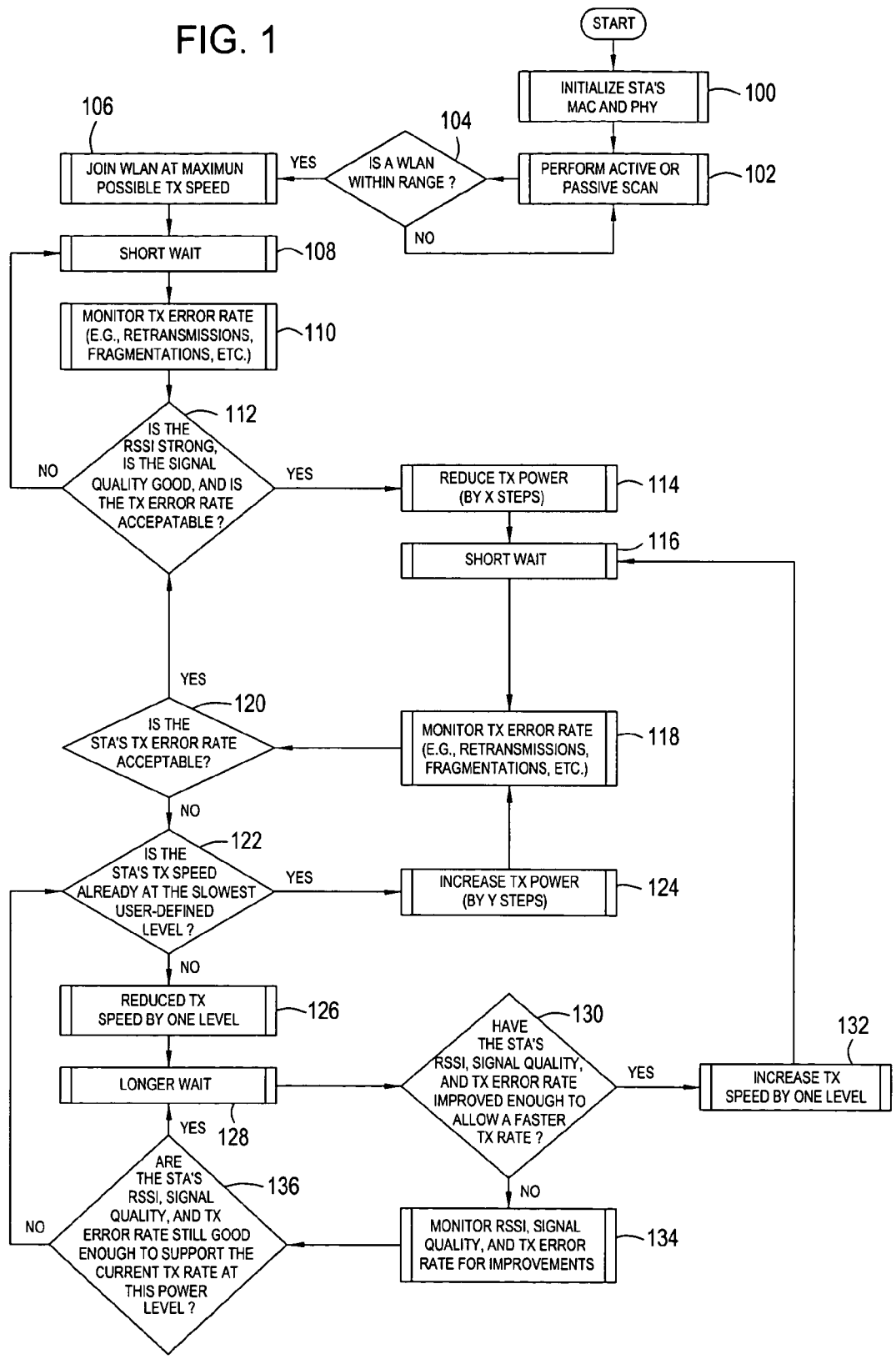
FIG. 1 shows a flow chart of method steps for autonomously and dynamically optimizing transmission power of a wireless network endpoint, according to one embodiment of the invention.

FIG. 1 shows a flow chart of method steps for autonomously and dynamically optimizing transmission power of a wireless network endpoint, according to one embodiment of the invention. Persons skilled in the art will understand that any system configured to perform the method steps in any order is within the scope of the invention.

As shown in FIG. 1, the method for dynamically optimizing starts in step 100 where the wireless driver performs standard initialization of the physical layer (the "PHY") and the medium access control sublayer (the "MAC") of the endpoint (the term "driver" as used herein may refer to a software driver executing in a host CPU, firmware on a microcontroller associated with or embedded in the wireless MAC, or a hardware state machine performing control functions of the MAC). In step 102, the wireless driver performs a standard search to determine whether a wireless local area network ("LAN") access point is present and available. As is well known, the driver uses either an active scan or a passive scan for this purpose. In step 104, the wireless driver determines whether an access point is present and available. When no access point is present and available, the method returns to step 102, and the wireless driver continues its active scan or passive scan. If the wireless driver determines that an access point is present and available, the method proceeds to step 106 where the endpoint joins the wireless LAN at the maximum available transmission speed for that endpoint. In an alternative embodiment, the wireless driver may be configured such that the user may select the transmission speed at which the endpoint joins the wireless LAN. Persons skilled in the art will recognize that steps 100 through 106 are standard steps for acquiring and joining a wireless LAN under the IEEE 802.11 standard.

In step 108, the wireless driver waits a certain amount of time for data transmissions between the access point and the endpoint to initiate fully and to make certain that any signal interference between the access point and the endpoint is real and sustained, as opposed to transient. In step 10, the wireless driver monitors the transmission error rate of the signal that the endpoint transmits to the access point. More specifically, persons skilled in the art understand that transmission errors associated with normal data traffic between the access point and the endpoint are continuously managed at the MAC. In this embodiment, the wireless driver monitors the rate of these transmission errors.

In step 112, the wireless driver determines whether the signal that the endpoint receives from the access point is of sufficiently good quality and whether the received signal strength indication (the "RSSI") of the received signal is sufficiently strong. As persons skilled in the art will understand, the signal-to-noise ratio of a given signal corresponds to the quality of that signal. Thus, in this embodiment, the wireless driver monitors the signal-to-noise ratio of the received signal to determine the quality of the received signal. As persons skilled in the art also will understand, the RSSI of the received signal is continuously measured at the PHY in a wireless LAN endpoint. Thus, in this embodiment, the wireless driver monitors the RSSI of the received signal measured at the PHY to determine whether the RSSI is strong.

In step 112, the wireless driver also determines whether the transmission error rate of the signal that the endpoint transmits to the access point is acceptable. More specifically, in one embodiment, the wireless driver determines whether the transmission error rate deviates from a statistically-determined historic transmission error rate for that endpoint in the existing wireless LAN environment. If the transmission error rate corresponds to the historic transmission error rate, then the transmission error rate is considered to be acceptable. If, however, the transmitted error rate deviates from the historic transmission error rate, then the transmission error rate is considered to be unacceptable.

This embodiment of the method returns to step 108 if the wireless driver determines that the quality of the received signal is not good, the RSSI is not strong enough or the transmission error rate is unacceptable. The method proceeds to step 114 if the wireless driver determines that the quality of the received signal is good, the RSSI is strong and the current transmission error rate is acceptable.

In step 114, the wireless driver is configured to reduce the transmission power at the endpoint by a certain incremental amount, x. In step 116, the wireless driver waits a certain amount of time before continuing through the method steps to allow the various elements of the wireless LAN to adjust fully to the new transmission power level. In step 118, the wireless driver again monitors the transmission error rate of the signal transmitted by the endpoint. In this embodiment, the wireless driver monitors the transmission error rate as described above in conjunction with step 110. In step 120, the wireless driver determines whether the transmission error rate is still acceptable at the reduced power level. In this embodiment, the wireless driver makes such a determination as described above in conjunction with step 112. If the transmission error rate is acceptable, then the method returns to step 112. If the transmission error rate is unacceptable at the current (reduced) power level, then the method proceeds to step 122.

In step 122, the wireless driver determines whether the endpoint transmission speed is equal to the slowest acceptable endpoint transmission speed as designated by the user. More specifically, in one embodiment, when first attempting to join the wireless LAN, the user is asked to specify certain system parameters of the impending session. One such system parameter is the slowest endpoint transmission speed that the user is willing to accept. The wireless networking standard supported by the endpoint determines the universe of possible endpoint transmission speeds. For example, if the endpoint supports IEEE 802.11b, then the possible endpoint transmission speeds are 1 Mbps, 2 Mbps, 5.5 Mbps and 11 Mbps. The user designates one of these transmission speeds as the slowest acceptable endpoint transmission speed.

If the endpoint transmission speed is equal to the slowest acceptable endpoint transmission speed, then the method proceeds to step 124 where the wireless driver is configured to increase the transmission power of the endpoint by a certain incremental amount, y. The method then returns to step 118. If the endpoint transmission speed is not equal to the slowest acceptable endpoint transmission speed, then the method proceeds to step 126 where the wireless driver is configured to decrease the endpoint transmission speed by one level. Again, the wireless networking standard supported by the endpoint determines what endpoint transmission speed is one level below the current endpoint transmission speed. For example, if the endpoint supports IEEE 802.11b and the current endpoint transmission speed is 5.5 Mbps, then 2 Mbps is the endpoint transmission speed one level below the current endpoint transmission speed. As persons skilled in the art will understand, the modulation scheme used with a lower endpoint transmission speed typically tolerates a lower signal to noise ratio in order to transmit data successfully. Lowering the endpoint transmission speed therefore decreases the amount of endpoint transmission power required to transmit data successfully.

In step 128, the wireless driver waits a certain amount of time before continuing through the method steps to allow the various elements of the wireless LAN to adjust fully to the new endpoint transmission speed. One skilled in the art will recognize that the wait period in step 128 typically should be longer than that of steps 108 and 116 because the endpoint transmission speed at step 128 generally will be slower than that at steps 108 and 116. As data transmissions generally take longer at a slower transmission speed, more time may be necessary at step 128 than at steps 108 and 116 to allow the various elements of the wireless LAN to adjust to a new system parameter (i.e., the reduced endpoint transmission speed). Specifically, if the transmission error rate is measured in errored packets per second, a longer amount of time is required to experience a given number of errors at a slower transmission speed.

In step 130, the wireless driver determines whether the RSSI of the received signal, the quality of the received signal and the transmission error rate of the transmitted signal have improved enough to allow for a faster endpoint transmission speed. In one embodiment, the wireless driver makes these determinations as described above in conjunction with step 112. If the wireless driver determines that the RSSI is sufficiently strong, the quality of the received signal is sufficiently high and the transmission error rate is sufficiently low, then the method proceeds to step 132 where the wireless driver is configured to increase the endpoint transmission speed by one level. The method then returns to step 116. If the wireless driver determines that the RSSI is too weak, the quality of the received signal is too low or the transmission error rate is too high, then the method proceeds to step 134.

In step 134, the wireless driver monitors the RSSI of the received signal, the quality of the received signal and the transmission error rate of the transmitted signal for improvements. In one embodiment, the wireless driver monitors these system parameters as described above in conjunction with steps 110 and 112. In step 136, the wireless driver determines whether the RSSI of the received signal, the quality of the received signal and the transmission error rate of the transmitted signal are still good enough to support the current endpoint transmission speed at the current level of endpoint transmission power. In one embodiment, the wireless driver makes these determinations as described above in conjunction with step 112. If the wireless driver determines that the RSSI is strong enough, the quality of the received signal is good enough and the transmission error rate is still acceptable, then the method proceeds to step 128. If the wireless driver determines that the RSSI is not strong enough, the quality of the received signal is too low or the transmission error rate has increased, thereby becoming unacceptable, then the method proceeds to step 122.

Persons skilled in the art will understand that the wireless driver is configured to cycle through the foregoing method steps continuously while data traffic is flowing between the access point and the endpoint. In this fashion, the balance between endpoint transmission speed and endpoint transmission power is continually optimized, thereby decreasing the amount of endpoint battery power consumed during operation while still permitting acceptable throughput.

Figure 2:
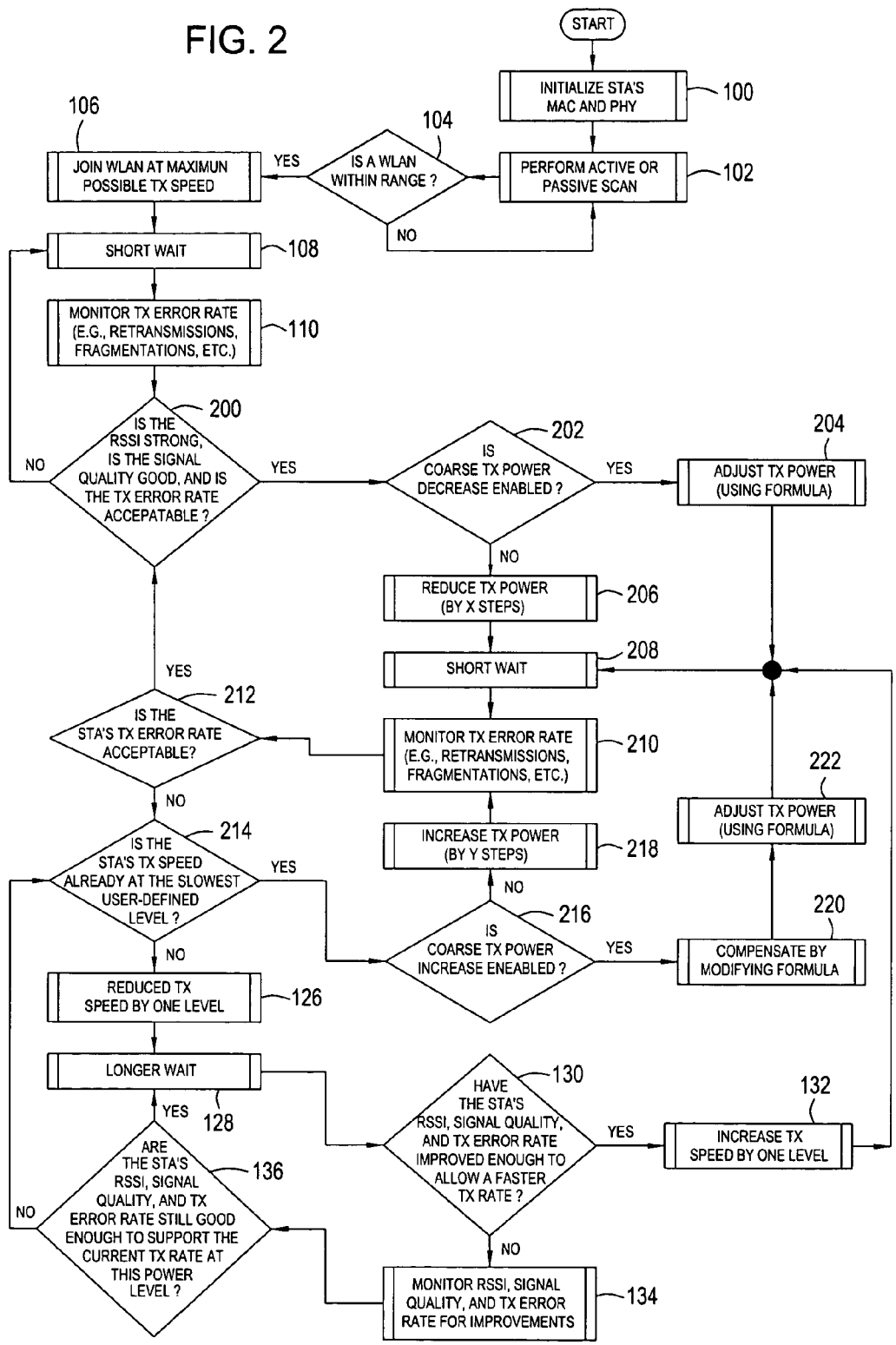
FIG. 2 shows a flow chart of method steps for autonomously and dynamically optimizing transmission power of a wireless network endpoint, according to an alternative embodiment of the invention.

FIG. 2 shows a flow chart of method steps for autonomously and dynamically optimizing transmission power of a wireless network endpoint, according to an alternative embodiment of the invention. Persons skilled in the art will understand that any system configured to perform the method steps in any order is within the scope of the invention.

The methodology set forth in FIG. 2 is similar in various respects to that set forth in FIG. 1. In particular, the initialization steps and wait step described in steps 100 through 110 of FIG. 1 are repeated in the methodology set forth in FIG. 2. In addition, the steps for adjusting the endpoint transmission speed described in steps 126 through 136 of FIG. 1 are repeated in the methodology set forth in FIG. 2. As steps 100 through 110 and 126 through 136 have already been described in conjunction with FIG. 1, the description of FIG. 2 focuses only on the steps for adjusting the transmission power level of the endpoint set forth in steps 200 through 222.

In step 200, the wireless driver determines whether the RSSI of the received signal is strong, the quality of the received signal is good and the transmission error rate of the transmitted signal is acceptable. In this embodiment, the wireless driver makes these determinations as described above in conjunction with step 112 of FIG. 1. If either the RSSI of the received signal is not strong, the quality of the received signal is not good or the transmission error rate is unacceptable, then the method returns to step 108 as shown in FIG. 2. If the RSSI of the received signal is strong enough, the quality of the received signal is sufficiently high and the transmission error rate is acceptable, then the method proceeds to step 202.

In step 202, the wireless driver determines whether coarse transmission power adjustment functionality is enabled. If coarse transmission functionality is either not supported or is supported but not enabled, the wireless driver understands that the transmission power level of the endpoint should be finely adjusted, as opposed to coarsely adjusted, and the method proceeds to step 206 to finely adjust the transmission power. In step 206, the wireless driver is configured to reduce the transmission power by a certain incremental amount, x. In this embodiment, step 206 is equivalent to step 114 of FIG. 1. In step 208, the wireless driver waits a certain amount of time before continuing through the method steps to allow the various elements of the wireless LAN to adjust fully to the new transmission power level. In this embodiment, step 208 is equivalent to step 116 of FIG. 1.

Referring back to step 202, if coarse transmission functionality is supported and enabled, then the method proceeds to step 204 to coarsely adjust the transmission power level of the endpoint. In step 204, the wireless driver is configured to determine what the transmission power should be using a formula that expresses transmission power as a function of one or more system parameters and to adjust the transmission power accordingly. For example, in one possible embodiment, the formula may state that the product of the strength of the received signal (as determined by the RSSI of the received signal) and the endpoint transmission power remains constant. Thus, as the received signal strength increases (e.g., as a result of the endpoint moving closer to the access point), the transmission power is decreased proportionally. Similarly, as the received signal strength decreases, the transmission power is increased to compensate. After the transmission power has been adjusted, the method proceeds to step 208.

In step 210, the wireless driver monitors the transmission error rate of the signal transmitted by the endpoint. In this embodiment, step 210 is equivalent to step 118 of FIG. 1. In step 212, the wireless driver determines whether the transmission error rate is still acceptable. In this embodiment, step 212 is equivalent to step 120 of FIG. 1. If the transmission error rate is acceptable, the method returns to step 200. If the transmission error rate is unacceptable, the method proceeds to step 214 where the wireless driver determines whether the endpoint transmission speed is already equal to the slowest acceptable endpoint transmission speed as was designated by the user. In one embodiment, step 214 is equivalent to step 122 of FIG. 1. If the endpoint's current transmission speed is greater than the slowest acceptable endpoint transmission speed, the method proceeds to step 216 as shown in FIG. 2. If the endpoint transmission speed is equal to the slowest acceptable endpoint transmission speed, the method proceeds to step 126.

In step 216, the wireless driver again determines whether coarse transmission power adjustment functionality is supported by the endpoint and enabled. If coarse transmission power functionality is either not supported or supported and not enabled, the method proceeds to step 218 where the wireless driver is configured to increase the transmission power of the endpoint by a certain incremental amount, y. In this embodiment, step 218 is equivalent to step 124 of FIG. 1. The method then returns to step 210. If coarse transmission power functionality is supported and enabled, then the method proceeds to step 220 where the wireless driver may be configured to modify the transmission power adjustment formula to compensate for various observed system parameter changes. For example, in one possible embodiment, the transmission power formula is adjusted to compensate for the lower endpoint transmission speed and the lower signal-to-noise ratio required by the modulation scheme that corresponds to that lower endpoint transmission speed. In step 222, the wireless driver is configured to determine what the transmission power should be using the modified formula, which again expresses transmission power as a function of one or more system parameters. The wireless driver is further configured to adjust the transmission power accordingly. The method then returns to step 208.

Persons skilled in the art will understand that the methodology described in conjunction with FIG. 2 may be used when a rapid reduction in transmission power is desirable. In such situations, for example, the coarse adjustment functionality may be enabled to achieve a fast reduction in transmission power. The coarse adjustment functionality may then be disabled to allow the transmission power to be more finely tuned by subsequently increasing or decreasing the transmission power in small increments. Further, persons skilled in the art will recognize that any combination of coarse and fine adjustment of transmission power may be achieved with the methodology set forth in FIG. 2. For example, transmission power may be first decreased using the coarse adjustment functionality and then increased or decreased incrementally, and the transmission power may be first increased using the coarse adjustment functionality and then increased or decreased incrementally. Alternatively, transmission power may be first decreased and/or increased incrementally and then coarsely. In yet other alternatives, transmission power may be increased and/or decreased only coarsely or only incrementally.

Persons skilled in the art also will understand that the wireless driver is configured to cycle through the foregoing method steps continuously while data traffic is flowing between the access point and the endpoint. In this fashion, the balance between endpoint transmission speed and endpoint transmission power is continually optimized, thereby substantially decreasing the amount of endpoint battery power consumed during operation.

Figure 3:
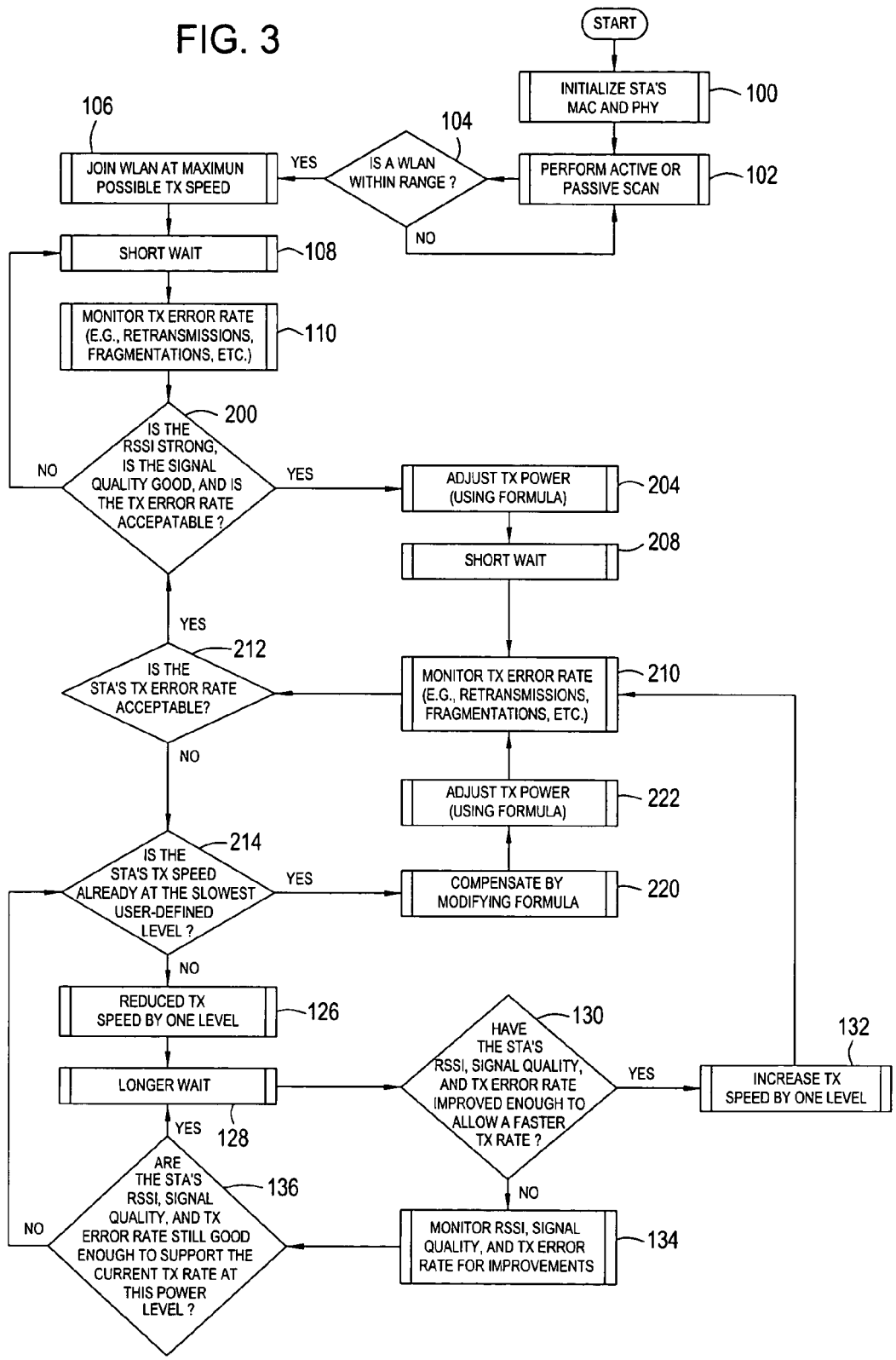
FIG. 3 shows a flow chart of method steps for autonomously and dynamically optimizing transmission power of a wireless network endpoint, according to another alternative embodiment of the invention.

FIG. 3 shows a flow chart of method steps for autonomously and dynamically optimizing transmission power of a wireless network endpoint, according to another alternative embodiment of the invention. Persons skilled in the art will understand that any system configured to perform the method steps in any order is within the scope of the invention.

The methodology set forth in FIG. 3 is similar to that set forth in FIG. 2, except that the methodology of FIG. 3 does not include steps for fine tuning the transmission power level of the endpoint by increasing or decreasing the transmission power in small increments. Instead, the methodology of FIG. 3 only includes steps for coarsely adjusting the transmission power level using a formula that expresses transmission power as a function of one or more system parameters as described above in conjunction with FIG. 2. Accordingly, the methodology of FIG. 3 includes only steps 200, 204, 208, 210, 212, 214, 220 and 222 of the transmission power adjustment steps set forth in the methodology of FIG. 2. The methodology of FIG. 3 does not include steps 202, 206, 216 and 218 as these steps address switching from coarse adjustment to fine adjustment and fine turning the transmission power level of the endpoint by adjusting the transmission power in increments.

Again, persons skilled in the art will understand that the wireless driver is configured to cycle through the method steps set forth in FIG. 3 continuously while data traffic is flowing between the access point and the endpoint. In this fashion, the balance between endpoint transmission speed and endpoint transmission power is continually optimized, thereby decreasing the amount of endpoint battery power consumed during operation.

Figure 4:
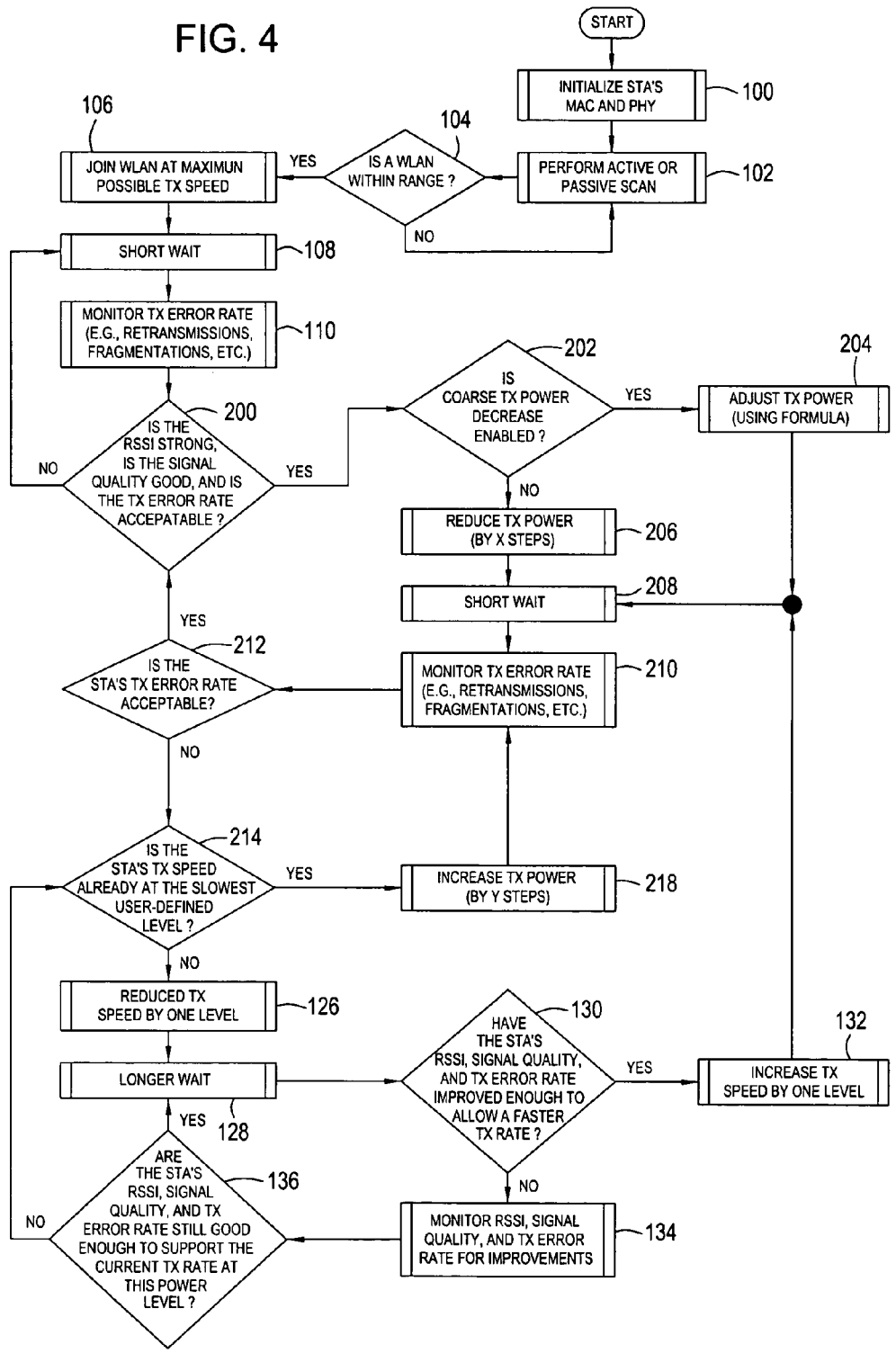
FIG. 4 shows a flow chart of method steps for autonomously and dynamically optimizing transmission power of a wireless network endpoint, according to yet another alternative embodiment of the invention.

FIG. 4 shows a flow chart of method steps for autonomously and dynamically optimizing transmission power of a wireless network endpoint, according to yet another alternative embodiment of the invention. Persons skilled in the art will understand that any system configured to perform the method steps in any order is within the scope of the invention.

The methodology set forth in FIG. 4 is similar to that set forth in FIG. 2, except that the methodology of FIG. 4 does not include steps for coarsely increasing the transmission power level of the endpoint. More specifically, the methodology of FIG. 4 does not include steps 216, 220 or 222 of the transmission power adjustment steps set forth in the methodology of FIG. 2. Those steps address switching from coarse adjustment to fine adjustment and coarsely increasing the transmission power level of the endpoint using a formula that expresses transmission power as a function of one or more system parameters.

Again, persons skilled in the art will understand that the wireless driver is configured to cycle through the method steps set forth in FIG. 4 continuously while data traffic is flowing between the access point and the endpoint. In this fashion, the balance between endpoint transmission speed and endpoint transmission power is continually optimized, thereby decreasing the amount of endpoint battery power consumed during operation.

Figure 5:
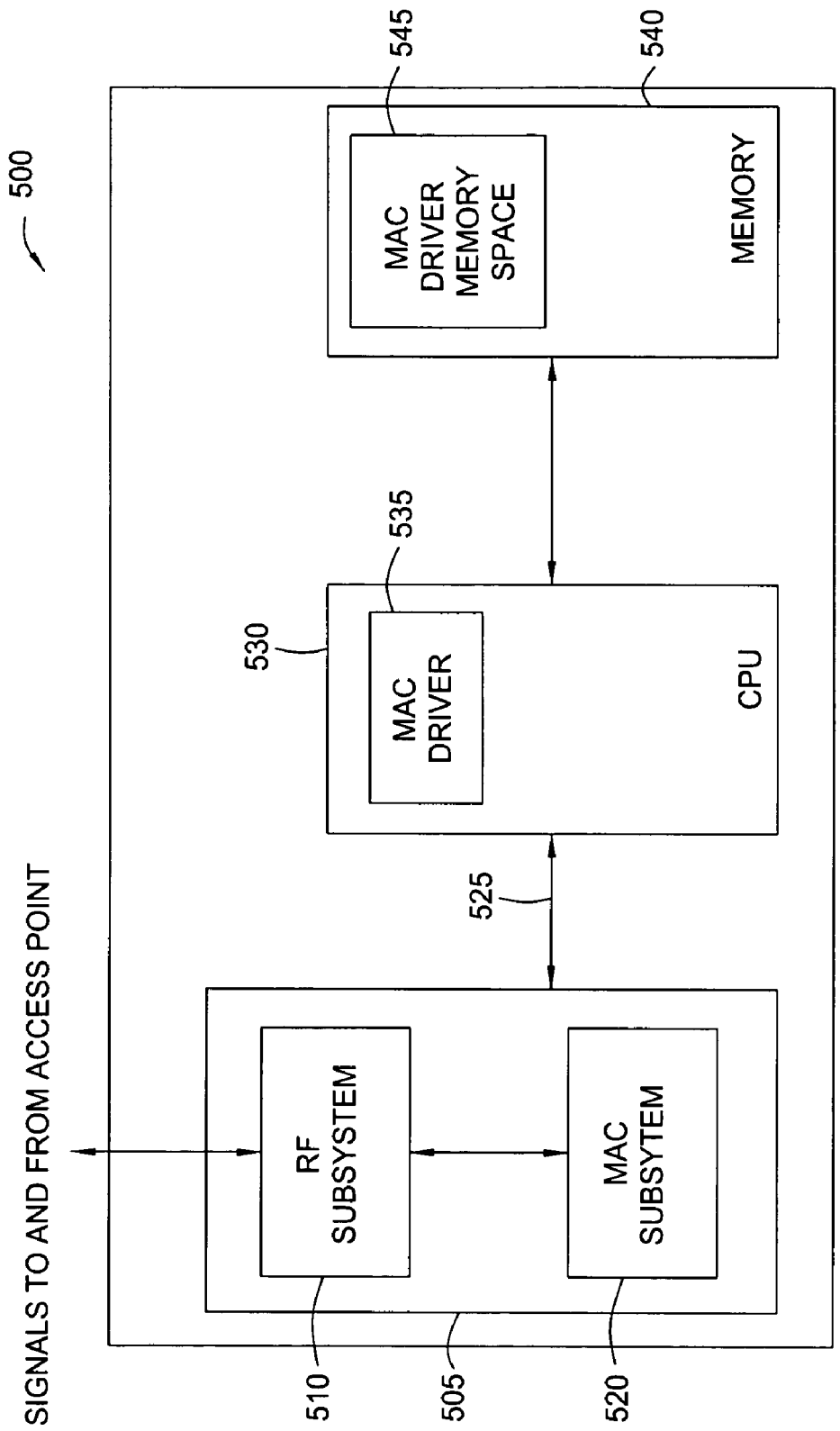
FIG. 5 is a conceptual diagram of a computing device that may be configured to implement the method steps of FIGS. 1 through 4, according to one embodiment of the present invention.

FIG. 5 is a conceptual diagram of a computing device 500 that may be configured to implement the method steps of FIGS. 1 through 4, according to one embodiment of the present invention. Computing device 500 may be any type of wireless computing device such as, for example, a laptop computer, a personal digital assistant or a cellular phone. As shown, computing device 500 includes, without limitation, a radio frequency (RF) subsystem 510, a MAC subsystem 520, a central processing unit (CPU) 530 and a memory 540. RF subsystem 510 and MAC subsystem 520 are well known in the art, specifications for which are set forth in chapter 11 of the IEEE 802.11 standard ("Wireless LAN Medium Access Control (MAC) and Physical Layer (PHY) Specifications"). A MAC driver 535, which is similar to the wireless driver referenced above in conjunction with FIGS. 1-4, runs on CPU 530 (and within driver memory space 545 of memory 540). CPU 530 is coupled to a networking element 505, which includes RF subsystem 510 and MAC subsystem 520, via input/output bus 525. In alternative embodiments, the optimization algorithms described herein may be implemented using a processor other than CPU 530, such as a dedicated networking processor, a graphics processor, some other type of special-purpose processor, or a hardware state machine with special-purpose logic dedicated to implementing only this functionality.

RF subsystem 510 is configured to measure the RSSI and the signal-to-noise ratio associated with each frame of a signal received by computing device 500 from the access point. RF subsystem 510 is further configured to measure the transmission error rate associated with a corresponding signal transmitted from computing device 500 to the access point. RF subsystem 510 is further configured to transmit these measurements as well as the received frames to MAC subsystem 520. MAC driver 535, through CPU 530, is configured to interpret these measurements at a set frequency and to determine what adjustments to the transmission power or transmission speed should be made in view of one the methodologies of FIGS. 1-4. MAC driver 535 is further configured to instruct MAC subsystem 520 to adjust the gain for transmission power or transmission speed, as the case may be, in RF subsystem 510.

Persons skilled in the art will recognize that computing device 500 may be configured to include other elements to support additional interfaces, such as, without limitation, a PCI bus, a PCI express bus, a system management bus, a universal serial bus or any other industry standard or proprietary bus. Further, the foregoing describes only one system in which the invention may be implemented. In alternative embodiments, the invention may be implemented in any type of computing device or equivalent system containing the components necessary to implement the various functionalities described herein. Persons skilled in the art will therefore understand that the hardware environment depicted in conjunction with computing device 500 in no way limits the scope of the invention.

The invention has been described above with reference to specific embodiments. Persons skilled in the art, however, will understand that various modifications and changes may be made thereto without departing from the broader spirit and scope of the invention as set forth in the appended claims. For example, the functionality described above in conjunction with FIGS. 1-4 may be implemented in software and/or hardware. With respect to computing device 500 of FIG. 5, hardware and software elements other than those conforming to the IEEE 802.11 standard may be used implement the methodologies of FIGS. 1-4. In alternative embodiments, the strength of the beacon signal transmitted by the access point to the endpoint may be used in lieu of the strength of the RSSI of the data signal received from the access point in any of the steps included in any of the disclosed methodologies.

In addition to the foregoing, the decision to implement one of the methodologies described herein may be made in any number of ways. For example, in one embodiment, when first attempting to join the wireless LAN, the user may be prompted to select a mode that will aggressively reduce power during operation. Selecting this mode would then cause the endpoint to implement one of the disclosed methodologies. In an alternative embodiment, one of the disclosed methodologies may be implemented automatically, without any input from the user.

Finally, although FIGS. 1-4 refer to using the disclosed methodologies in a wireless LAN, persons skilled in the art will understand that the disclosed methodologies may be used in any type of wireless network. The foregoing description and drawings are, accordingly, to be regarded in an illustrative rather than a restrictive sense.

What is claimed is:

1. A method for autonomously and dynamically optimizing transmission power of an endpoint in a wireless network, the method comprising the steps of:

at the endpoint, measuring a received signal strength, a received signal quality and a received transmission error rate of a signal transmitted from an access point in the wireless network to the endpoint at a first endpoint transmission power and a first endpoint transmission speed;

at the endpoint, reducing the first endpoint transmission power to a second endpoint transmission power when the received signal strength, the received signal quality and the received transmission error rate of the signal transmitted at the first endpoint transmission power and first endpoint transmission speed are determined to be at respectively acceptable operating levels;

at the endpoint, measuring the received transmission error rate of the signal transmitted at the second endpoint transmission power and the first endpoint transmission speed;

at the endpoint, adjusting one of the second endpoint transmission power or the first endpoint transmission speed based on whether the received transmission error rate of the signal transmitted at the second endpoint transmission power and the first endpoint transmission speed is still at its respective acceptable operating level;

at the endpoint, reducing the first endpoint transmission speed to a second endpoint transmission speed, if the received transmission error rate of the signal transmitted at the second endpoint transmission power and the first endpoint transmission speed is not at its respective acceptable operating level and the first endpoint transmission speed is not equal to a slowest level endpoint transmission speed;

at the endpoint, determining whether the received signal strength, the received signal quality and the received transmission error rate of the signal transmitted at the second endpoint transmission power and the second endpoint transmission speed have improved sufficiently to support a faster endpoint transmission speed;

at the endpoint, determining whether the received signal strength, the received signal quality and the received transmission error rate of the signal transmitted at the second endpoint transmission power and the second endpoint transmission speed are at the respectively acceptable operating levels and, if not, at the endpoint, determining whether the second endpoint transmission speed is equal to the slowest level endpoint transmission speed; and at the endpoint, increasing the second endpoint transmission power to a third endpoint transmission power, if the second endpoint transmission speed is equal to the slowest level endpoint transmission speed.

2. The method of claim 1, wherein the step of reducing the first endpoint transmission power includes adjusting the first endpoint transmission power based on a formula, if functionality for coarsely decreasing endpoint transmission power is enabled.

3. The method of claim 1, wherein the step of reducing the first endpoint transmission power includes decreasing the first endpoint transmission power by a fixed increment, if functionality for coarsely decreasing endpoint transmission power is not enabled.

4. The method of claim 1, wherein the step of reducing the first endpoint transmission power includes adjusting the first endpoint transmission power based on a formula.

5. The method of claim 1, wherein the step of reducing the first endpoint transmission power includes decreasing the first endpoint transmission power by a fixed increment.

6. The method of claim 1, wherein the step of increasing the second endpoint transmission power includes adjusting the second endpoint transmission power based on a formula, if functionality for coarsely increasing endpoint transmission power is enabled.

7. The method of claim 1, wherein the step of increasing the second endpoint transmission power includes increasing the second endpoint transmission power by a fixed increment, if functionality for coarsely increasing endpoint transmission power is not enabled.

8. The method of claim 1, wherein the step of increasing the second endpoint transmission power includes adjusting the second endpoint transmission power based on a formula.

9. The method of claim 1, wherein the step of increasing the second endpoint transmission power includes increasing the second endpoint transmission power by a fixed increment.

10. A method for autonomously and dynamically optimizing transmission power of an endpoint in a wireless network, the method comprising the steps of:

at the endpoint, measuring a received signal strength, a received signal quality and a received transmission error rate of a signal transmitted from an access point in the wireless network to the endpoint at a first endpoint transmission power and a first endpoint transmission speed;

at the endpoint, reducing the first endpoint transmission power to a second endpoint transmission power when the received signal strength, the received signal quality and the received transmission error rate of the signal transmitted at the first endpoint transmission power and first endpoint transmission speed are determined to be at respectively acceptable operating levels;

at the endpoint, measuring the received transmission error rate of the signal transmitted at the second endpoint transmission power and the first endpoint transmission speed;

at the endpoint, adjusting one of the second endpoint transmission power or the first endpoint transmission speed based on whether the received transmission error rate of the signal transmitted at the second endpoint transmission power and the first endpoint transmission speed is still at its respective acceptable operating level;

at the endpoint, reducing the first endpoint transmission speed to a second endpoint transmission speed, if the received transmission error rate of the signal transmitted at the second endpoint transmission power and the first endpoint transmission speed is not at its respective acceptable operating level and the first endpoint transmission speed is not equal to a slowest level endpoint transmission speed;

at the endpoint, determining whether the received signal strength, the received signal quality and the received transmission error rate of the signal transmitted at the second endpoint transmission power and the second endpoint transmission speed have improved sufficiently to support a faster endpoint transmission speed;

at the endpoint, determining whether the received signal strength, the received signal quality and the received transmission error rate of the signal transmitted at the second endpoint transmission power and the second endpoint transmission speed are at the respectively acceptable operating levels and, if not, at the endpoint, determining whether the second endpoint transmission speed is equal to the slowest level endpoint transmission speed; and at the endpoint, reducing the second endpoint transmission speed to a third endpoint transmission speed, if the second endpoint transmission speed is not equal to the slowest level endpoint transmission speed.

11. The method of claim 10, wherein the step of reducing the first endpoint transmission power includes adjusting the first endpoint transmission power based on a formula, if functionality for coarsely decreasing endpoint transmission power is enabled.

12. The method of claim 10, wherein the step of reducing the first endpoint transmission power includes decreasing the first endpoint transmission power by a fixed increment, if functionality for coarsely decreasing endpoint transmission power is not enabled.

13. The method of claim 10, wherein the step of reducing the first endpoint transmission power includes adjusting the first endpoint transmission power based on a formula.

14. The method of claim 10, wherein the step of reducing the first endpoint transmission power includes decreasing the first endpoint transmission power by a fixed increment.

15. The method of claim 10, wherein the step of reducing the second endpoint transmission power includes adjusting the second endpoint transmission power based on a formula, if functionality for coarsely increasing endpoint transmission power is enabled.

16. The method of claim 10, wherein the step of reducing the second endpoint transmission power includes increasing the second endpoint transmission power by a fixed increment, if functionality for coarsely reducing endpoint transmission power is not enabled.

17. The method of claim 10, wherein the step of reducing the second endpoint transmission power includes adjusting the second endpoint transmission power based on a formula.

18. The method of claim 10, wherein the step of reducing the second endpoint transmission power includes reducing the second endpoint transmission power by a fixed increment.

* * * * *